United States Patent [19]
Viano

[11] 3,772,875
[45] Nov. 20, 1973

[54] CHAIN LINK OF VARIABLE PITCH

[76] Inventor: Luigi Viano, Via Corado Corradini 20, Moncalieri, Italy

[22] Filed: Sept. 7, 1971

[21] Appl. No.: 178,329

[52] U.S. Cl. .................... 59/78.1, 59/91, 198/189, 248/49
[51] Int. Cl. ............................................ F16g 13/16
[58] Field of Search .................... 59/78.1, 78, 80, 59/82, 91; 248/49, 51; 198/177, 189

[56] References Cited
UNITED STATES PATENTS

| | | | |
|---|---|---|---|
| 2,184,747 | 12/1939 | Levai | 59/91 |
| 3,053,358 | 9/1962 | Gross | 59/78.1 |
| 3,330,105 | 7/1967 | Weber | 59/78.1 |
| 3,382,668 | 5/1968 | Berkes | 59/78.1 |
| 3,546,875 | 12/1970 | Weber | 59/78.1 |

FOREIGN PATENTS OR APPLICATIONS
1,448,337  6/1966  France ............................... 198/189

Primary Examiner—Charles W. Lanham
Assistant Examiner—Gene P. Crosby
Attorney—Oberlin, Maky, Donnelly & Renner

[57] ABSTRACT

A chain link wherein the pitch and thus the radius of curvature of the chain formed of the links is variable by changing the distances between the pivot points of the chain links. Auxiliary intermediate elements are provided for keeping the chain in a horizontal position when traveling to convey tubes, cables and the like, and in accordance with the preferred form of the invention, the chain links and intermediate elements are constructed and arranged to enclose and support cables or the like passing therethrough.

5 Claims, 13 Drawing Figures

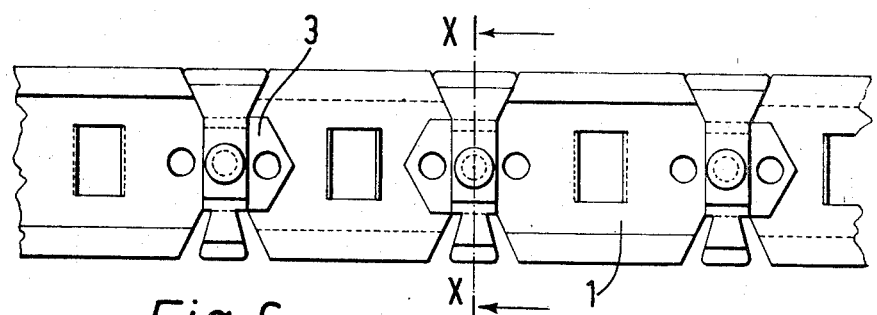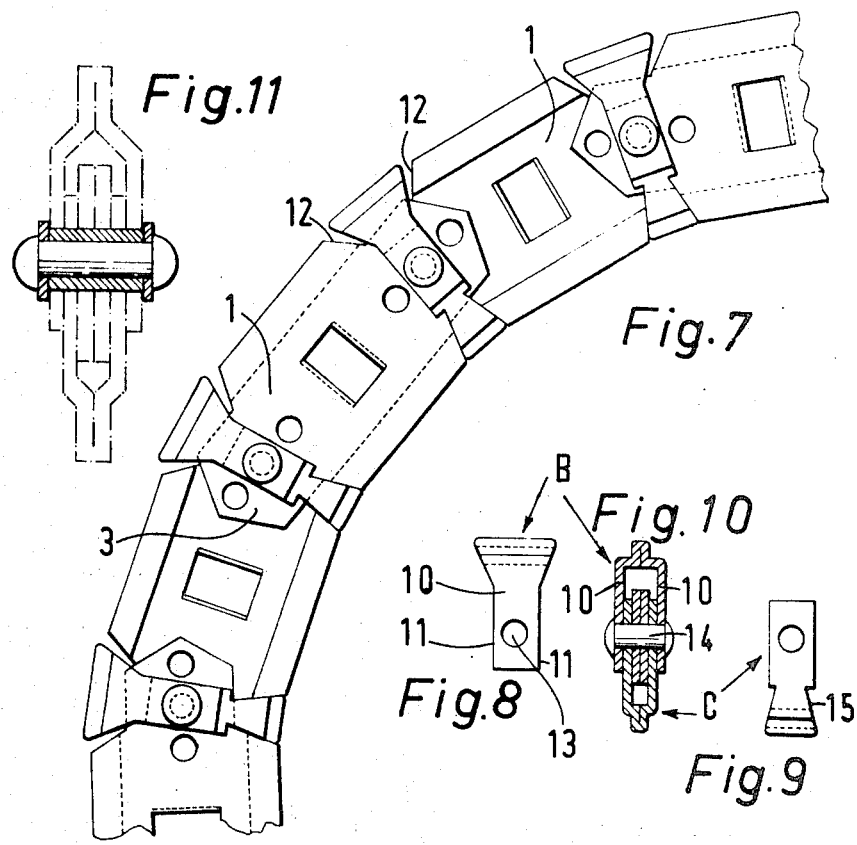

3,772,875

CHAIN LINK OF VARIABLE PITCH

BACKGROUND OF THE INVENTION

This invention relates as indicated to a chain link of variable pitch for forming chains of predetermined curvature for supporting and feeding transport means of all kinds through conduits on guides.

It is known in the art to support and feed various material such as tubes, electric cables and the like for carrying transporting means of all types through conduits on guides to working machines is effected by self-supporting articulated chains formed of different elements adapted to be coupled together, and present invention comprises an improvement over such known devices.

SUMMARY OF THE INVENTION

The present invention provides a chain link of the type described above for supporting and feeding materials such as tubes, cables and the like for carrying transport means of all kinds to working machines through conduits on guides which frequently bend around curves according to the particular traverse present. The chain link is provided with a lug located at the opposed ends thereof, which lugs are provided with a plurality of holes serving to couple adjacent chain links, the holes being arranged in a straight line so that a greater or smaller curvature of the chain can be achieved according to the hole which is chosen as a pivot point for coupling the links.

A further object of the present invention is to provide a self-supporting chain, i.e., a chain supported and working in centilever fashion in a horizontal plane, affording the possibility of obtaining a predetermined radius of curvature without having to remove the chain links by providing auxiliary or intermediate elements interposed between the chain links astride the pivotal connecting lugs therebetween. In accordance with the preferred form of the invention, the chain links and intermediate elements are constructed and arranged to form an enclosure for receiving and supporting cables or the like passing therethrough. Each link and associated pair of intermediate elements are generally U-shaped in cross section whereby the disposition of adjacent assemblies of links and elements, with their open ends in confronting abutment, provides an enclosure for such cables.

BRIEF DESCRIPTION OF THE APPLICATION DRAWINGS

FIG. 6 shows a straight portion of a chain with intermediate auxiliary elements arranged between the chain links to hold the chain in a horizontal position;

FIG. 7 shows a curved portion of a chain with the intermediate elements of FIG. 6;

FIG. 8 is a front view of an intermediate element serving to maintain the horizontal position of the chain;

FIG. 9 is a front view of an intermediate element serving to determine the radius of curvature of the chain;

FIG. 10 is a section taken on the line X—X of FIG. 6 and showing the assembly of the two intermediate elements mounted astride the lugs of two adjacent chain links;

FIG. 11 is a section similar to that of FIG. 10, but on a larger scale and showing a modification in which the intermediate elements and adjacent lugs of the chain links are mounted on a sleeve surrounding a pivot with the interposition of a washer on each end;

DESCRIPTION OF THE PREFERRED EMBODIMENTS

Figures 1, 2:
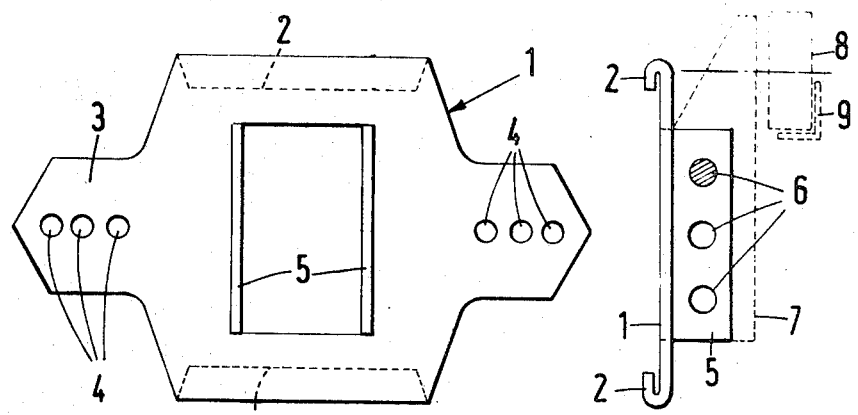
FIG. 1 is a front view of one form of chain link.
FIG. 2 is a side view of the chain link of FIG. 1.

Referring now in more detail to the application drawings, and initially to FIG. 1, a chain link 1 is punched from sheet metal and preferably has a hexagonal configuration with bent edges 2 (FIG. 2) on the two opposed horizontal sides to serve as supports on the running surface (not shown). A lug 3 is provided at each end of the chain link between the bent edges 2 and has three aligned holes 4 serving to couple the chain link to the adjacent ones (FIGS. 3, 4 and 5).

Two equal parallel lugs 5 are provided in the center of the chain link 1 by cutting and bending the sheet metal at 90° with respect to the major plane of the chain link. One or more holes 6 are provided in the lugs 5 and serve to secure a supporting element 7 (FIG. 2) which at one end may carry in cantilever fashion a freely rotatable roller 8 rolling on a sectional bar 9 serving as a guide bar for the chain. If necessary, the supporting element 7 may be mounted in an inverted position so that the roller 8 will be located downwardly to roll on the associated guide bar likewise located downwardly of the chain link. Although not shown, the lugs 5 may also serve to mount transversely extending plates or members for connecting two opposed links so as to form a chain composed of two series of links connected by the transverse members which may also serve to keep the chain in position and for supporting the material to be conveyed.

Figure 3:
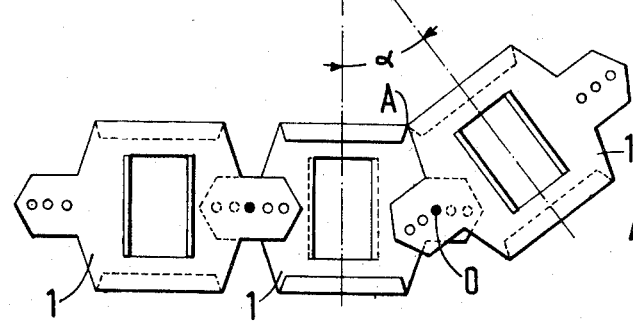
FIG. 3 is a schematic view showing on a reduced scale a portion of a chain formed of three of the links shown in FIGS. 1 and 2, two of the links being mounted on a straight line and the other in a curve with short pitch.
Figure 4:
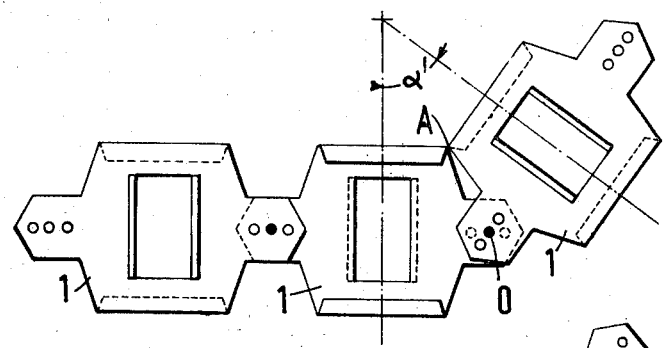
FIG. 4 is a view similar to FIG. 3 with the chain links mounted at medium pitch.
Figure 5:
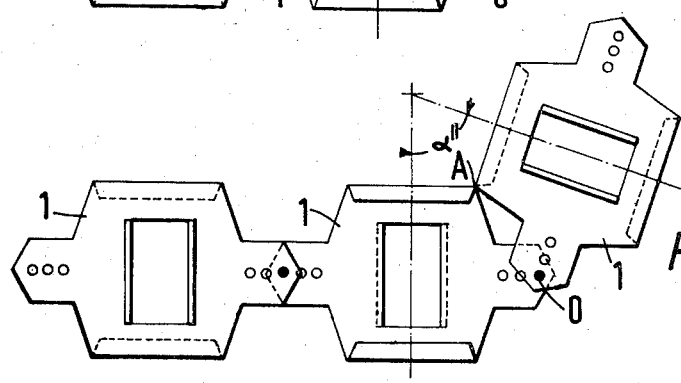
FIG. 5 is a view similar to FIG 3 with the chain links mounted at long pitch.

It will thus be seen that the chain link according to the invention permits different pitches and thus different radii of curvature to be obtained, as shown in FIGS. 3, 4 and 5 by the respective angles $\alpha$, $\alpha'$, and $\alpha''$ formed between two adjacent chain links. A small angle thus corresponds to a long radius of curvature and a large angle corresponds to a short radius of curvature.

As had been mentioned above, different combinations of connection between two or more chain links can be obtained by simply changing the position of pivotal connection therebetween. Similarly the distance between the holes in the connecting lugs may vary but must be equal in the two opposed lugs. Also the peripheral configuration of the chain link 1 may be different from what has been described and shown provided that there is also a contact point A between two adjacent chain links in the curvature of the chain and the above-mentioned relation of the angles with respect to the fulcrum 0 is maintained.

Referring now to FIGS. 6 to 11, a self-supporting chain may be formed with the links 1 of FIG. 1. Such chain may work in cantilever fashion in the horizontal plane and with a predetermined radius of curvature by using auxiliary elements interposed between the chain links.

An auxiliary intermediate element B serves to maintain the horizontal position of the chain and is made by punching from sheet metal and bending in the form of a U-shaped bracket with two parallel legs 10. The side edges 11 of the legs 10 are also parallel for some distance and then diverge with the same inclination of the sides 12 (FIG. 7) of pivotally connected chain links. A hole 13 is provided in each of the legs 10, the two holes being aligned to receive a pivot 14 (FIG. 10) serving as a fulcrum when two adjacent links 1 are pivotally connected with the intermediate element B astride the lugs 3 of the links 1. Due to the action of the intermediate auxiliary elements B the chain links are maintained in perfect horizontal alignment when the chain is running and such alignment is maintained as the lateral walls of the rear portion of the legs 10 of the intermediate element B have the same inclination as the sides 12 of the chain links.

Another intermediate element C similar to the intermediate element B but with a thinner and undercut rear portion is shown in FIG. 9, and has lateral walls 15 suitably inclined to obtain a predetermined radius of curvature of the chain. The intermediate element C is mounted on the same pivot 14 in the opposite direction so as to permit a variation of the radius of curvature of the chain (FIG. 7) irrespective of the configuration of the chain links 1.

In this embodiment of the invention, a horizontal position of the chain can be maintained, simultaneously imparting a predetermined radius of curvature to the chain by mounting the intermediate element B astride of the intermediate element C on the same pivot, as shown in FIG. 10. The legs 10 of the intermediate element B extend in parallel at a distance therebetween which is larger than the distance between the legs of the intermediate element C to permit the legs of the opposite intermediate element C to be received between the legs 10 of the intermediate element B.

Figure 12:
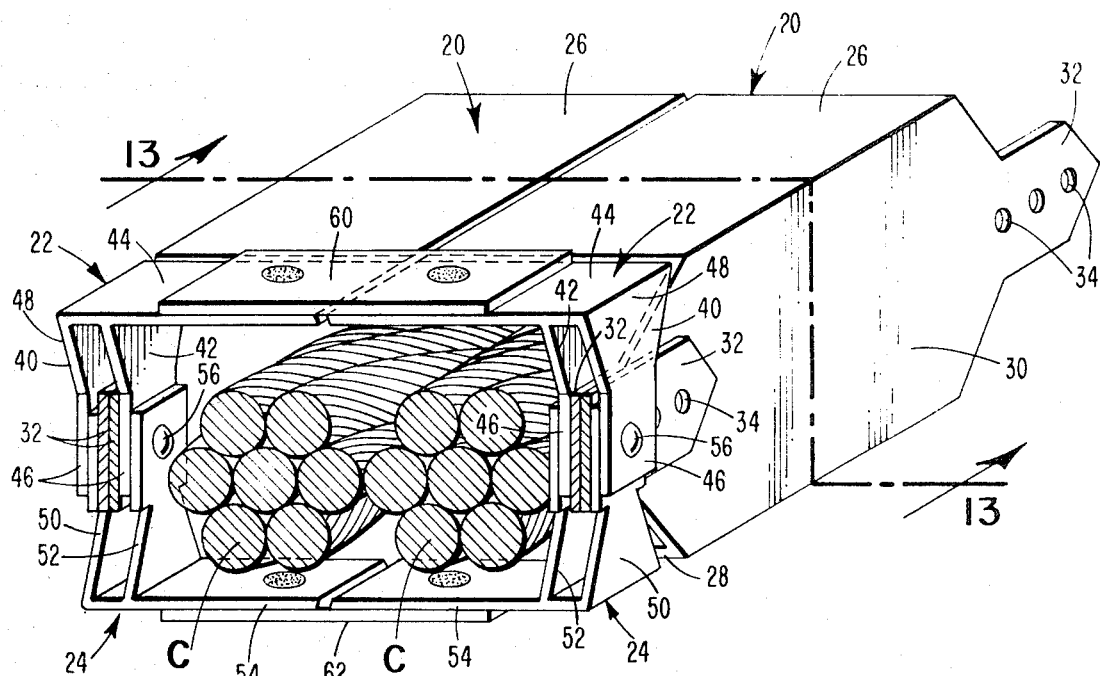
FIG. 12 is a perspective, fragmentary view of the preferred form of the invention wherein the chain links and associated pair of intermediate elements are generally U-shaped in cross section.
Figure 13:
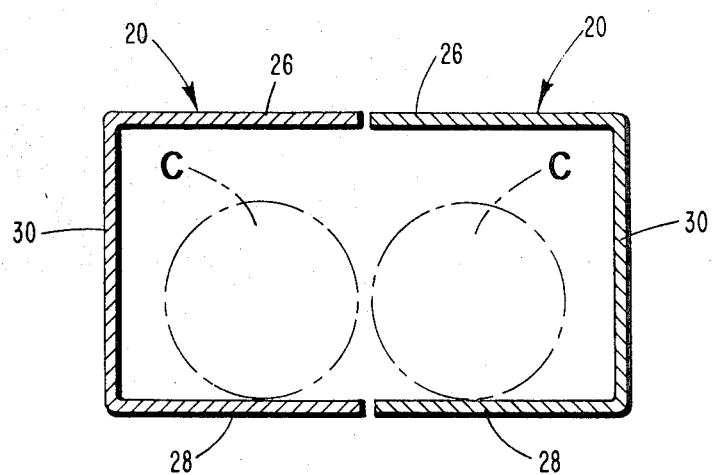
FIG. 13 is a sectional view taken on line 13—13 of FIG. 12.

Referring now to the preferred embodiment of the invention illustrated in FIGS. 12 and 13, there is illustrated therein a pair of adjacently disposed chain link and intermediate element assemblies. The chain links are identically constructed and are generally indicated at 20. The interconnecting intermediate elements are likewise identical, with the upper intermediate elements, that is, shown at the top in the orientation of the assembly as shown in FIG. 12, being generally indicated at 22, and the bottom intermediate elements being generally indicated at 24.

Each chain link 20 is generally U-shaped in cross section, comprising side wall portions 26 and 28 and a central section 30 disposed perpendicular to the side walls. The link at the opposite ends thereof is provided with lugs commonly designated at 32 each of which is formed with a plurality of openings 34, there being three such openings illustrated in the form shown. One such lug 32 is illustrated on the chain link 20 appearing at the right of FIG. 12, with the opposite lug being partially cut away in the fragmentary perspective view which comprises FIG. 12. A second lug 32 appearing adjacent the intermediate elements 22 and 24 comprises the leading lug of the adjacently disposed chain link, which is not visible in this Figure.

Each upper intermediate element 22 comprises a pair of spaced legs 40 and 42 and a laterally extending top flange 44. In a manner similar to the intermediate element shown in FIG. 8, each of the legs 40 and 42 of the upper element 22 comprise generally rectangular bottom portions 46 and generally trapexoidal shaped upper portions 48, with the angularity of the latter determining the radius of curvature of the assembly in the manner above described.

Similarly, each lower intermediate element 24 comprises spaced walls 50 and 52, and a laterally extending bottom flange 54. The walls 50 and 52 are likewise formed both with rectangular portions in the hinged area of the elements, and trapezoidal shaped outer portions for controlling the curvature of the chain link assembly. The spacing of the walls 50 and 52 is such as to permit the same to be interleaved with the walls 40 and 42 of the upper element 22 when these elements are assembled with adjacently disposed link lugs 32 as shown in FIG. 12.

In assembling the chain links with the intermediate elements 22 and 24, the lugs 32 of adjacently disposed chain links are inserted between the legs 50 and 42, with the latter, as above described, being interleaved with the legs 40 and 52 of the upper element 22. A connecting pin 56 is thereafter inserted through the aligned openings formed in each of these elements for providing the hinge connection.

It will be seen that when a pair of upper and lower intermediate elements 22 and 24 are hinged to a chain link 20, a continuous, generally U-shaped enclosure is formed. It will further be noted that when a second such assembly is disposed adjacent such assembly, with the leading edges of the chain links and intermediate elements in confronting abutment as shown in FIG. 12, a hollow enclosure is provided for receiving cables or the like indicated at C. The chain link and intermediate element assemblies thus not only support the cables but protect the same against environmental operating conditions. Plates 60 and 62 are preferably provided to maintain the assemblies in their FIG. 12 assembled relation, with the plates overlying the flanges 44 and 54, respectively, and being secured thereto in any suitable manner, such as by mechanical fastening means or by spot welding, as shown. Transverse separation of the chain is thereby prevented.

It will be understood that although only two adjacently disposed chain links have been shown in FIG. 12, these will be interconnected with intermediate elements in much the same manner as shown in FIGS. 6 and 7, with the orientation of the chain links depending upon the operating conditions. It will further be understood that although the walls 26, 28 and 30 of each chain link 20 have been shown as being flat, these can be shaped or cut out as desired depending upon the ultimate use to which chain link is put. Further, the cables C can be supported entirely by the assemblies shown in FIG. 12, or can be simply covered thereby in the event the cables are provided with separate support.

I claim:

1. A chain of variable radius of curvature composed of links made of sheet metal generally U-shaped in cross section with open ends and formed with connecting lugs at the two opposed ends thereof, said lugs being provided with a plurality of coupling holes arranged in a straight line for coupling together successively disposed links, and intermediate auxiliary elements disposed between successive chain links, said links and said auxiliary elements being constructed and arranged to permit linear movement of said chain through a predetermined radius of curvature without removing from the chain links a transverse alignment of a pair of such chains, with the open ends of said links being in confronting abutment providing an enclosure for cables or the like.

2. The chain of claim 1 wherein said intermediate auxiliary elements comprise an upper element having a pair of spaced legs and a laterally extending flange perpendicular to said legs, and a lower element similarly comprised of a pair of spaced legs and a laterally extending flange perpendicular to said legs, with said auxiliary elements when said legs thereof are assembled with said lugs of said chain links being similarly U-shaped in cross section and forming generally a continuation of the associated U-shape chain link.

3. The chain of claim 2 wherein said legs of said upper and lower auxiliary elements are interleaved and receive therebetween the adjacent lugs of successive chains links, and pin means extending through said lugs and openings in said legs for pivotally connecting the members together.

4. The chain of claim 2 wherein each leg of said upper and lower auxiliary elements comprises a generally rectangular end portion for pivotal connection of said elements to said chain link, and an adjacent section formed with outwardly diverging edges, said links comprising opposed leg sections at a central connecting section, with said central connecting section being formed with inclined edges at the ends thereof complimental to said diverging edges of said auxiliary elements, whereby confronting engagement of the adjacently disposed edges of said auxiliary elements and said chain links serve to maintain the predetermined curvature of said chain.

5. The chain of claim 1 wherein said chain links comprise a pair of opposed, parallel legs and a central, connecting section, with the opposed end edges of said central section on either side of said lugs being inclined relative to a plane perpendicular to the plane of said central section, said auxiliary elements comprising an upper element having a pair of spaced legs and a laterally extending flange, and a lower element having a pair of spaced legs and a laterally extending flange, said upper and lower elements when assembled with said chain link being generally U-shaped in cross section and forming a continuation of said chain link, with said legs of said upper and lower auxiliary elements having edge portions inclined so as to compliment the inclined edges of said central section of said chain link thereby to provide the predetermined radius of curvature of said chain.

* * * * *